(12) United States Patent
Wakabayashi

(10) Patent No.: US 7,065,189 B2
(45) Date of Patent: Jun. 20, 2006

(54) VOICE MAIL APPARATUS AND METHOD OF PROCESSING VOICE MAIL

(75) Inventor: Kunihiko Wakabayashi, Tokyo (JP)

(73) Assignee: NEC Infrontia Corporation, Kawasaki (JP)

( * ) Notice: Subject to any disclaimer, the term of this patent is extended or adjusted under 35 U.S.C. 154(b) by 490 days.

(21) Appl. No.: 09/233,475

(22) Filed: Jan. 20, 1999

(65) Prior Publication Data

US 2003/0043973 A1 Mar. 6, 2003

(30) Foreign Application Priority Data

Jan. 20, 1998 (JP) ................... 10-021554

(51) Int. Cl.
*H04M 1/64* (2006.01)

(52) U.S. Cl. .................. 379/88.26; 455/412.1

(58) Field of Classification Search ............ 379/88.13, 379/88.14, 88.17, 142, 88.18, 88.19, 88.2, 379/88.21, 93.24, 90.01, 93.01
See application file for complete search history.

(56) References Cited

U.S. PATENT DOCUMENTS

| | | | | |
|---|---|---|---|---|
| 4,972,461 A | * | 11/1990 | Brown et al. ............ 379/88.26 |
| 5,381,466 A | | 1/1995 | Shibayama et al. ........... 379/88 |
| 5,557,659 A | * | 9/1996 | Hyde-Thomson ........... 379/233 |
| 6,052,442 A | * | 4/2000 | Cooper et al. ........... 379/88.19 |
| 6,304,636 B1 | * | 10/2001 | Goldberg et al. ........ 379/88.14 |

FOREIGN PATENT DOCUMENTS

| | | | |
|---|---|---|---|
| JP | 3-238961 | | 10/1991 |
| JP | 405227274 A | * | 9/1993 |
| JP | 6-121051 | | 4/1994 |
| JP | 9-214560 | | 8/1997 |
| JP | 10-13545 | | 1/1998 |
| JP | 10-262077 | | 9/1998 |
| JP | 10-303970 | | 11/1998 |

\* cited by examiner

*Primary Examiner*—Fan Tsang
*Assistant Examiner*—Ming Chow

(74) *Attorney, Agent, or Firm*—Foley & Lardner LLP

(57) ABSTRACT

A voice mail apparatus and a method of processing voice mail are provided. Upon taking out digitized voice from a memory, a sender identifier identifies a proper number of a sender of the digitized voice. A retrieval of a table is performed to find an address corresponding to the proper number. A documentation converter converts reply voice to digitized document. The digitized document of the reply voice is transmitted by a transmitter to an address of the sender.

12 Claims, 4 Drawing Sheets

FIG. 3

| SENDER NUMBER | E-MAIL ADDRESS |
|---|---|
| A1 | B1 |
| A2 | B2 |
| ⋮ | ⋮ |
| An | Bn |

US 7,065,189 B2

VOICE MAIL APPARATUS AND METHOD OF PROCESSING VOICE MAIL

FIELD OF THE INVENTION

The present invention relates to a voice mail apparatus and a method of processing voice mail, which may be usable in exchanging, within a computer network, information by voice message or document with voice message attachment.

BACKGROUND OF THE INVENTION

The term "voice mail service" is herein used to mean a service to store digitized voice message from a sender into a memory accessible by a receiver and to take out document data from the sender in terms of voice message. A voice mail apparatus employed for such a voice mail service includes a memory provided in an information network. Storage regions of the memory are assigned to registered terminals, respectively.

According to a known voice mail apparatus, among voice mail users registered at the apparatus, a voice mail sender can send a voice mail to a voice mail receiver and the voice mail receiver can reply to the voice mail sender by calling the voice mail sender.

SUMMARY OF THE INVENTION

An object of the present invention is to provide a voice mail apparatus and a method of processing voice mail wherein a voice mail receiver can reply to a voice mail sender quickly and without calling the voice mail sender.

According to one aspect of the present invention, there is provided a voice mail apparatus comprising:
a memory to store received digitized voice from a sender;
an identifier to identify the sender that has sent the digitized voice; and
a table containing plural addresses against plural senders, respectively.

According to a specific aspect of the present invention, there is provided a voice mail apparatus comprising:
a memory to store received digitized voice from a sender;
an identifier to identify a proper sender number of the sender that has sent the digitized voice; and
a table containing plural addresses against plural proper sender numbers of plural senders, respectively.

According to another aspect of the present invention, there is provided a method of processing voice mail comprising the steps of:
identifying a sender of digitized voice upon taking out the digitized voice from a memory; and
performing retrieval of a table to find an address of the sender.

According to a further aspect of the present invention, there is provided a method of processing voice mail comprising the steps of:
identifying a proper number of a sender of digitized voice upon taking out the digitized voice from a memory; and
performing retrieval of a table to find an address corresponding to the proper number.

BRIEF DESCRIPTION OF THE DRAWINGS

FIG. 3 illustrates content of information on a table within the voice mail apparatus.

DESCRIPTION OF THE PREFERRED EMBODIMENTS

Figure 1:
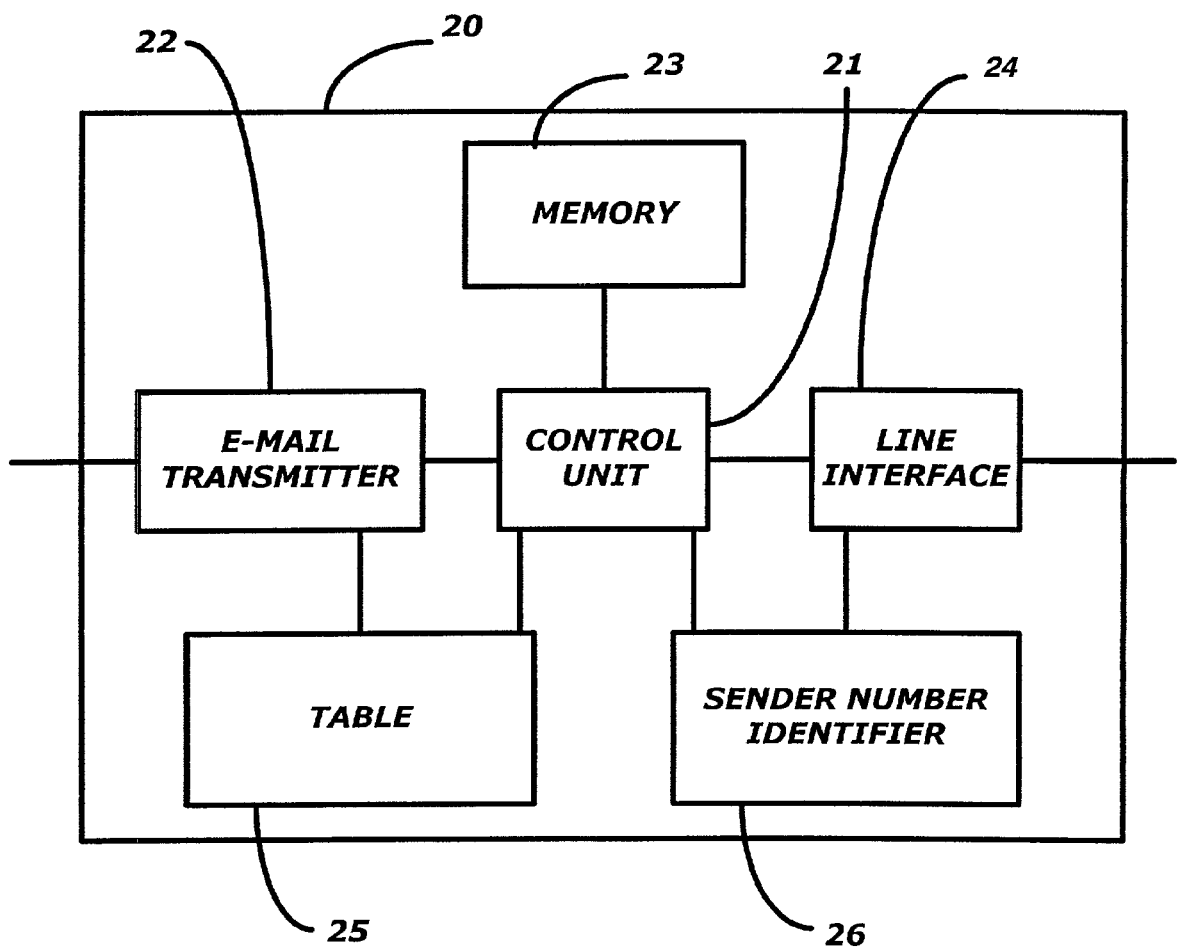
FIG. 1 is a block diagram illustrating a preferred embodiment of a voice mail apparatus according to the present invention.

Referring to the accompanying drawings, FIG. 1 shows an embodiment of a voice mall apparatus 20 according to the present invention. The voice mail apparatus 20 includes a control unit 21, a line interface 24, an E-mail transmitter 22, a memory 23, a sender number identifier 26 and a table 25. The control unit 21 controls the line interface 24, E-mail transmitter 22, memory 23, sender number identifier 26 and table 25.

Figure 2:
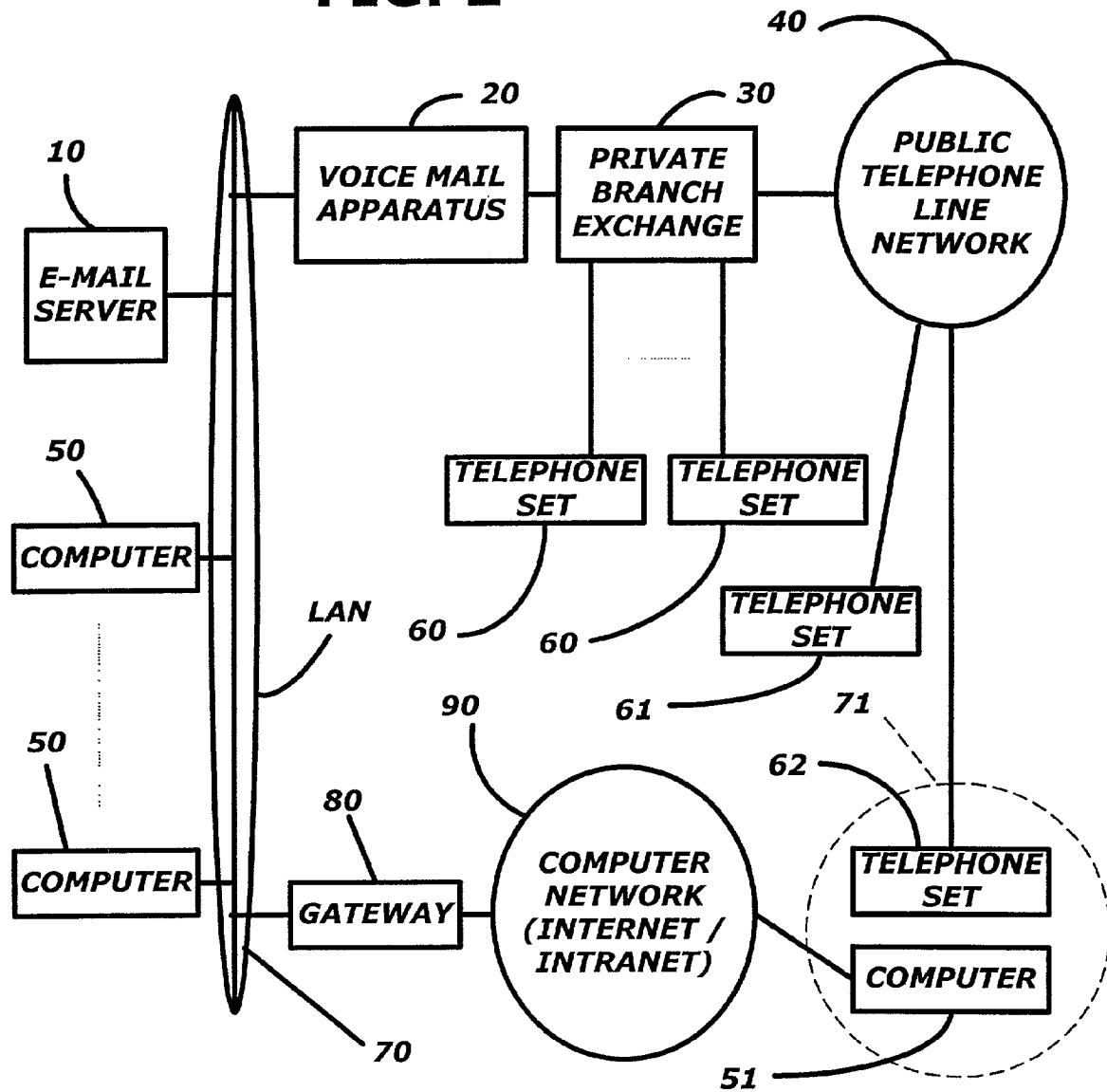
FIG. 2 is a block diagram illustrating a communication network into which the voice mail apparatus is placed.

The line interface 24 interconnects the voice mail apparatus 20 and a private branch exchange 30 (see FIG. 2). The E-mail transmitter 22 transmits E-mail to an E-mail server 10 (see FIG. 2). The memory 23 stores voice mails and the sender number identifier 26 identifies a sender number attached to each received voice mail. The table 25 stores E-mail addresses against sender numbers.

FIG. 2 illustrates a network incorporating the embodiment of voice mail apparatus 20 according to the present invention. In this network, the voice mail apparatus 20 is connected to a local area network (LAN) 70. The LAN 70 includes E-mail server 10 and plural computers 50 and connected via gateway 80 to computer network 90. The gateway 80 may take the form of a provider. The computer network 90 may take the form of internet and/or intranet.

The voice mail apparatus 20 is connected to a private branch exchange 30 including plural telephone sets 60. The private branch exchange 30 is connected to a public telephone line network 40.

Telephone sets 61 and 62 are connected to the public telephone line network 40. The telephone set 62 may take the form of a subscribed telephone set in a family 71. The family 71 may have a computer, preferably, a personal computer 51, connected to the computer network 90.

In the embodiment, the table 25 stores E-mail addresses corresponding to sender numbers of the subscribers of this voice mail service.

As shown in FIG. 3, the table 25 stores E-mail addresses B1, B2 . . . Bn corresponding to sender numbers A1, A2 . . . An, respectively.

Figure 4:
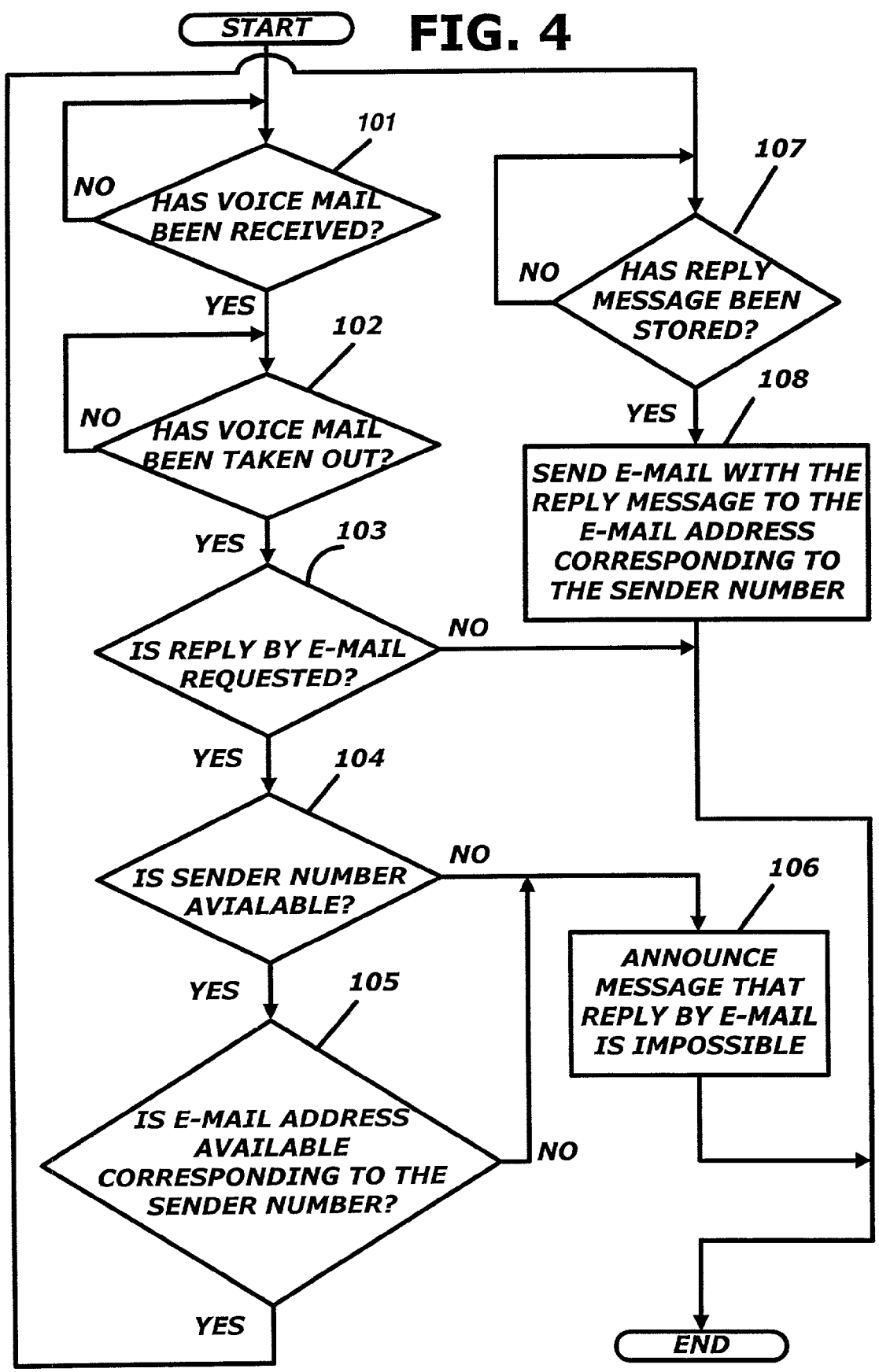
FIG. 4 is a flow diagram of a processing flow.

The flow diagram of FIG. 4 illustrates a control routine of the preferred implementation of the present invention. It is now assumed that the telephone set 62 sends a voice mail to the telephone set 61. The telephone set 62 is connected via the public telephone line network 40 and the private branch exchange 30 to the voice mail apparatus 20. The voice mail apparatus 20 stores the voice mail in the memory 23. In step 101, the control routine determines whether or not the voice mail apparatus 20 has received any new voice mail. The control routine repeats this determination in step 101 unless new voice mail has been stored in the memory 23. Immediately after the memory 23 has stored new voice mail, the control routine proceeds from step 101 to step 102 and the sender number identifier 26 identifies sender number A2 corresponding to the telephone set 62. The voice mail apparatus 20 holds the voice mail at an address corresponding to the sender number A2 within the memory 23. In step 102, the control routine determines whether or not the telephone set 61 has taken out the voice mail from the telephone set 62 from the memory 23. The telephone set 61 is connected to the voice mail apparatus 20 via the public telephone line network 40 and the private branch exchange 30. The control routine repeats this determination in step 102 unless the telephone set 61 has taken out the voice mail from the memory 23.

Immediately after the telephone set 61 has taken out the voice mail from the memory 23, the control routine determines whether or not a reply request by the telephone set 61 is available in step 103. In this implementation, dual tone multi-frequency (DTMF) signaling is used to send this request.

If, in step 103, it is determined that there is no reply request from the telephone set 61, the control routine comes to an end. If, in step 103, there is reply request from the telephone set 61, the control routine proceeds to step 104. In step 104, the control unit 21 determines whether or not the sender number A2 is available in the table 25.

If, in step 104, it is determined that the table 25 contains the sender number A2, the control routine proceeds to step 105. In step 105, the control unit 21 determines whether or not the table 25 contains an E-mail address B2 corresponding to the sender number A2 after performing retrieval operation of the table 25 against the sender number A2. If, in step 105, the control unit 21 finds the E-mail address B2 corresponding to the sender number A2, the interrogation in this step results in affirmative. Then, the control routine proceeds to step 107.

If the interrogation in step 104 results in negative or the interrogation in step 105 results in negative, the control routine proceeds to step 106. This is the case where the table 25 does not contain the sender number A2 of the E-mail address B2 corresponding to the sender number A2. In this case, the voice mail apparatus 20 sends to the telephone set 61 a voice announcement that reply by E-mail is impossible (step 106) before the control routine comes to an end.

Unless the telephone set 61 receives the voice announcement that reply by E-mail is impossible, the telephone set 61 may send its operator voice reply message to the voice mail apparatus 20. The memory 23 stores the operator voice reply message. In step 107, the control unit 21 determines whether or not the memory 23 has stored the operator voice reply message sent by the telephone set 61.

The control routine repeats this determination in step 107 unless the memory 23 has stored the operator voice reply message. If, in step 107, it is determined that the memory 23 has stored the voice reply message, the control routine proceeds to step 108.

In step 108, the voice mail apparatus 20 sends to an E-mail server 10 an E-mail against the E-mail address B2 from a proper E-mail address of the voice mail apparatus 20. Specifically, the E-mail transmitter 22 transmits the E-mail with the voice reply message attachment via the LAN 70 to the E-mail server 10.

The E-mail server 10 sends the E-mail with the voice reply message attachment to the computer 51 having the E-mail address B2 via the LAN 70 and the computer network 90. E-mail receiver may hear the voice reply message attached to the E-mail by operating the computer 51.

If it is desired to read voice reply message in terms of sentences, the voice mail apparatus may be modified to have a media converter to convert voice reply message into text for sending as E-mail. In this case, receiver of the E-mail can read the voice reply message.

The voice mail apparatus may have a table containing E-mail addresses against voice mail users, respectively. Using this table, the voice mail apparatus uses E-mail address of a voice mail user as a sender address in sending a reply E-mail to a receiver. In this case, the receiver can recognize the sender before taking out the reply message.

From the preceding description of the embodiments, it is appreciated that a voice mail receiver can reply to a voice mail sender quickly and without any call to the sender.

The above-described voice mail implementation of the present invention is an example implementation. Moreover, various modifications to the present invention may occur to those skilled in the art and will fall within the scope of the present invention as set forth below.

What is claimed is:

1. A voice mail apparatus comprising:
a memory to store received digitized voice in a voice mail sent from a sender, and wherein the memory further stores at least one voice response message of a recipient of the voice mail;
an identifier to identify a sender number attached to the voice mail that contains the digitized voice, the sender number corresponding to the sender that has sent the digitized voice;
an e-mail transmitter to send an e-mail from the recipient to the sender;
a table that provides a correspondence between a plurality of e-mail addresses and a plurality of sender numbers, respectively; and
a control unit configured to control operation of the voice mail apparatus,
wherein the digitized voice is stored at a particular memory address that is assigned to the sender within the memory, based on the identification of the sender number as performed by the identifier,
wherein the table is accessed to allow a recipient of the digitized voice to send an e-mail response to the corresponding e-mail address of the sender,
wherein the control unit obtains the at least one voice response message of the recipient from the memory, attaches the at least one voice response message to an e-mail to be sent to the corresponding e-mail address of the sender, and provides the e-mail to the e-mail transmitter to be output to the sender,
wherein the e-mail is capable of being opened by the sender so that the sender can review the at least one voice response message of the recipient, by the sender opening the e-mail attachment and reviewing the at least one voice response message, and
wherein the sender number corresponds to a telephone set of the sender.

2. A voice mail apparatus comprising:
a memory to store received digitized voice in a voice mail sent from a sender, and wherein the memory further stores at least one voice response message of a recipient of the voice mail;
an identifier to identify a proper sender number attached to the voice mail that contains the digitized voice, the sender number corresponding to the sender that has sent the digitized voice;
an e-mail transmitter to send an e-mail from the recipient to the sender;
a table that provides a correspondence between a plurality of e-mail addresses and a plurality of proper sender numbers, respectively; and
a control unit configured to control operation of the voice mail apparatus,
wherein the digitized voice is stored at a particular memory address that is assigned to the sender within the memory, based on the identification of the sender number as performed by the identifier, wherein the table is accessed to allow a recipient of the digitized voice to send an e-mail response to the corresponding e-mail address of the sender, wherein the control unit obtains the at least one voice response message of the recipient from the memory, attaches the at least one voice response message to an e-mail to be sent to the corresponding e-mail address of the sender, and provides the e-mail to the e-mail transmitter to be output to the sender, wherein the e-mail is capable of being opened by the sender so that the sender can review the at least one voice response message of the recipient, by the sender opening the e-mail attachment and reviewing the at least one voice response message, and wherein the sender number corresponds to a telephone set of the sender.

3. A method of processing voice mail comprising the steps of:

storing in a memory, at least one voice response message from a recipient;

storing, in the memory, a digitized voice sent from a sender to the recipient;

identifying the sender of the digitized voice upon obtaining the digitized voice from the memory, the identifying being performed based on a sender number corresponding to the sender that is attached to the digitized voice;

storing, based on the sender number, the digital voice at a particular memory address within the memory, the particular memory address being assigned to the sender;

performing retrieval of a table to find an e-mail address of the sender so as to allow a recipient of the digitized voice to respond to the sender, the retrieval being based on the sender number; and obtaining the at least one voice reply message from the memory and attaching the at least one voice reply message to an e-mail to be sent to the e-mail address of the sender, wherein the table provides a correspondence between a plurality of e-mail addresses and a plurality of sender numbers, wherein the e-mail is capable of being opened by the sender so that the sender can review the at least one voice response message of the recipient, by the sender opening the e-mail attachment and reviewing the at least one voice response message, and wherein the sender number corresponds to a telephone set of the sender.

4. A method of processing voice mail comprising the steps of:

storing in a memory, at least one voice response message from a recipient;

storing, in the memory, a digitized voice sent from a sender to the recipient;

identifying the sender of the digitized voice upon obtaining the digitized voice from the memory, the identifying being performed based on a proper number corresponding to the sender that is attached to the digitized voice;

storing, based on the proper number, the digital voice at a particular memory address within the memory, the particular memory address being assigned to the sender;

performing retrieval of a table to find an e-mail address corresponding to the proper number so as to allow a recipient of the digitized voice to respond to the sender, the retrieval being based on the sender number; and obtaining the at least one voice reply message from the memory and attaching the at least one voice reply message to an e-mail to be sent to the e-mail address of the sender, wherein the table provides a correspondence between a plurality of e-mail addresses and a plurality of proper numbers, wherein the e-mail is capable of being opened by the sender so that the sender can review the at least one voice response message of the recipient, by the sender opening the e-mail attachment and reviewing the at least one voice response message, and wherein the sender number corresponds to a telephone set of the sender.

5. The voice mail apparatus as claimed in claim 1, wherein the at least one voice response message is first converted to a text message prior to be being attached to the email to be output to the sender.

6. The voice mail apparatus as claimed in claim 1, wherein the sender is capable of reviewing the at least one voice response message by either audibly playing the e-mail attachment via a computer speaker when the e-mail attachment is an audio file, or visually displaying the e-mail attachment via a computer monitor when the e-mail attachment is a text file.

7. The voice mail apparatus as claimed in claim 2, wherein the at least one voice response message is first converted to a text message prior to be being attached to the email to be output to the sender.

8. The voice mail apparatus as claimed in claim 2, wherein the sender is capable of reviewing the at least one voice response message by either audibly playing the e-mail attachment via a computer speaker when the e-mail attachment is an audio file, or visually displaying the e-mail attachment via a computer monitor when the e-mail attachment is a text file.

9. The method as claimed in claim 3, wherein the at least one voice response message is first converted to a text message prior to be being attached to the email to be output to the sender.

10. The method as claimed in claim 3, wherein the sender is capable of reviewing the at least one voice response message by either audibly playing the e-mail attachment via a computer speaker when the e-mail attachment is an audio file, or visually displaying the e-mail attachment via a computer monitor when the e-mail attachment is a text file.

11. The method as claimed in claim 4, wherein the at least one voice response message is first converted to a text message prior to be being attached to the email to be output to the sender.

12. The method as claimed in claim 4, wherein the sender is capable of reviewing the at least one voice response message by either audibly playing the e-mail attachment via a computer speaker when the e-mail attachment is an audio file, or visually displaying the e-mail attachment via a computer monitor when the e-mail attachment is a text file.

* * * * *